United States Patent
Roach et al.

(10) Patent No.: US 9,529,347 B2
(45) Date of Patent: Dec. 27, 2016

(54) OPERATOR ASSISTANCE SYSTEM FOR MACHINE

(71) Applicant: Caterpillar Inc., Peoria, IL (US)

(72) Inventors: Keegan W. Roach, Peoria, IL (US); Brad Robert Van De Veer, Washington, IL (US); Thomas E. Beccue, Germantown Hills, IL (US)

(73) Assignee: Caterpillar Inc., Peoria, IL (US)

( * ) Notice: Subject to any disclaimer, the term of this patent is extended or adjusted under 35 U.S.C. 154(b) by 121 days.

(21) Appl. No.: 14/470,977

(22) Filed: Aug. 28, 2014

(65) Prior Publication Data

US 2016/0060847 A1    Mar. 3, 2016

(51) Int. Cl.
| | | |
|---|---|---|
| *G05D 1/00* | (2006.01) | |
| *G05B 15/02* | (2006.01) | |
| *E02F 3/34* | (2006.01) | |
| *E02F 3/43* | (2006.01) | |
| *E02F 9/26* | (2006.01) | |

(52) U.S. Cl.
CPC ............. *G05B 15/02* (2013.01); *E02F 3/3411* (2013.01); *E02F 3/434* (2013.01); *E02F 9/26* (2013.01)

(58) Field of Classification Search
USPC .......................................................... 701/50
See application file for complete search history.

(56) References Cited

U.S. PATENT DOCUMENTS

| | | | |
|---|---|---|---|
| 3,643,828 A | 2/1972 | Elliott | |
| 3,827,024 A | 7/1974 | Anderson et al. | |
| 5,955,706 A | 9/1999 | Fonkalsrud et al. | |
| 6,246,226 B1 | 6/2001 | Kawase et al. | |
| 6,830,250 B2 | 12/2004 | Cervantez et al. | |
| 7,752,779 B2 | 7/2010 | Schoenmaker et al. | |
| 8,010,260 B2 | 8/2011 | Toda | |
| 8,352,210 B2 | 1/2013 | Kranz | |
| 8,567,551 B2 | 10/2013 | Trifunovic | |
| 9,221,659 B2 * | 12/2015 | Fukasu | E02F 9/26 |
| 2005/0092533 A1 | 5/2005 | Ishii | |
| 2006/0108127 A1* | 5/2006 | Batthala | A01B 63/1117 172/2 |
| 2009/0222176 A1 | 9/2009 | Florean et al. | |

(Continued)

FOREIGN PATENT DOCUMENTS

JP    2004239165    8/2004

*Primary Examiner* — Jonathan M Dager
(74) *Attorney, Agent, or Firm* — Caterpillar Inc.

(57) ABSTRACT

A system for assisting an operator to maneuver a machine on a worksite is provided. The system includes a rotation sensor associated with a transmission assembly of the machine. The rotation sensor is configured to generate a signal indicative of a rotation of a ground engaging member of the machine. The system includes a controller communicably coupled to the rotation sensor. The controller is configured to receive the signal indicative of the rotation of the ground engaging member of the machine. The controller is configured to determine if the machine is on a reverse traversal. The controller is configured to estimate a number of rotations of the ground engaging member based on the determination of the reverse traversal of the machine. The controller is configured to compare the estimated number of rotations with a predetermined threshold. The controller is further configured to alert the operator based on the comparison.

20 Claims, 8 Drawing Sheets

(56) References Cited

U.S. PATENT DOCUMENTS

| | | | |
|---|---|---|---|
| 2010/0023220 A1 | 1/2010 | Nakashima et al. | |
| 2010/0131158 A1 | 5/2010 | Saito | |
| 2010/0198466 A1* | 8/2010 | Eklund | E02F 9/26 |
| | | | 701/50 |
| 2010/0332061 A1 | 12/2010 | Forsloew et al. | |
| 2011/0087405 A1* | 4/2011 | Moshchuk | B62D 7/159 |
| | | | 701/41 |
| 2011/0254700 A1* | 10/2011 | Gharsalli | G08G 1/166 |
| | | | 340/904 |
| 2012/0158234 A1 | 6/2012 | Choi | |
| 2012/0239263 A1 | 9/2012 | Choi | |
| 2013/0041561 A1* | 2/2013 | Asami | E02F 9/2246 |
| | | | 701/50 |
| 2013/0199865 A1 | 8/2013 | Park | |
| 2013/0289836 A1* | 10/2013 | Li | B60W 10/30 |
| | | | 701/51 |
| 2014/0046540 A1* | 2/2014 | Ruth | G05D 1/0225 |
| | | | 701/41 |
| 2014/0222247 A1* | 8/2014 | Friend | G05D 1/0276 |
| | | | 701/2 |
| 2014/0225755 A1* | 8/2014 | Friend | G05D 1/0225 |
| | | | 340/988 |
| 2015/0070498 A1* | 3/2015 | Kriel | B60R 11/04 |
| | | | 348/148 |
| 2015/0371464 A1* | 12/2015 | Fujimori | G07C 5/0841 |
| | | | 701/29.1 |
| 2016/0024757 A1* | 1/2016 | Nomura | E02F 3/435 |
| | | | 414/687 |
| 2016/0153175 A1* | 6/2016 | Wei | E02F 9/2025 |
| | | | 701/50 |
| 2016/0232816 A1* | 8/2016 | Cai | G09B 19/24 |

\* cited by examiner

OPERATOR ASSISTANCE SYSTEM FOR MACHINE

TECHNICAL FIELD

The present disclosure relates to an operator assistance system, and more specifically to an operator assistance system for assisting an operator to maneuver a machine on a worksite.

BACKGROUND

During a load-dump work cycle performed by a machine such as, a wheel loader, the machine may be required to move back and forth on ground to travel from a loading location to an unloading location and vice versa. More specifically, the machine may be required to travel in a "V" shaped pattern between the loading location and the unloading location.

At the loading location, an implement of the machine may be positioned relatively low with respect to a frame of the machine in order to load material into the implement. After loading of the material, the machine may travel rearward for a distance up to a junction point. At the junction point, the machine may change course to align the implement with the loading location. Further, the machine may travel forward from the junction point for a distance up to the unloading location. At the unloading location, the implement may be required to be positioned relatively higher as compared to the position at the loading location, in order to unload or dump the material.

Along with moving the machine in the "V" shaped pattern, the operator may simultaneously need to gradually raise the implement from the relatively initially low position to the higher position for unloading. While traversing, the operator may have to ensure that the loaded implement is not under-lifted or over-lifted. When the implement is loaded and raised, the center of gravity of the machine may change. As a result, maneuvering or changing direction of travel of the machine in the raised position of the loaded implement may cause unbalance and/or tipping of the machine. Also, while attempting to align the machine with the unloading location, the operator may need to pay attention to an extent by which the machine is reversed, in order to avoid wasteful travel of the machine. Such work cycle may result in increased mental pressure on the operator due to requirement of performing a variety of tasks simultaneously which in turn may result in operational errors and affect overall productivity.

U.S. Pat. No. 6,830,250 describes a system for automatically and simultaneously controlling one or more vehicle functions by detecting the direction of movement of and the distance traveled by the vehicle. The control system includes an electronic sensor mounted on a selected one of the vehicle axles adjacent to and facing an anti-lock braking system tone ring of a selected one of the wheel hubs mounted on the axle. The sensor is electrically connected to an electronic control unit, which in turn is electrically connected to a vehicle function actuation device such as a lift axle solenoid or back-up alarm actuation device. The sensor transmits direction and distance information to the electronic control unit based on the movements of a plurality of teeth formed on the tone ring. The control system is a stand-alone system that is free of interfacing with other vehicle systems, such as the anti-lock braking system.

SUMMARY OF THE DISCLOSURE

In one aspect of the present disclosure, a system for assisting an operator to maneuver a machine on a worksite is provided. The system includes a rotation sensor associated with a transmission assembly of the machine. The rotation sensor is configured to generate a signal indicative of a rotation of a ground engaging member of the machine. The system also includes a controller communicably coupled to the rotation sensor. The controller is configured to receive the signal indicative of the rotation of the ground engaging member of the machine. The controller is configured to determine if the machine is on a reverse traversal. The controller is configured to estimate a number of rotations of the ground engaging member based on the determination of the reverse traversal of the machine. The controller is also configured to compare the estimated number of rotations with a predetermined threshold. The controller is further configured to alert the operator based on the comparison.

In another aspect of the present disclosure, a machine is provided. The machine includes a rotation sensor associated with a transmission assembly of the machine. The rotation sensor is configured to generate a signal indicative of a rotation of a wheel of the machine. The machine also includes a controller communicably coupled to the rotation sensor. The controller is configured to receive the signal indicative of the rotation of the wheel of the machine. The controller is configured to determine if the machine is on a reverse traversal. The controller is configured to estimate a number of rotations of the wheel based on the determination of the reverse traversal of the machine. The controller is also configured to compare the estimated number of rotations with a predetermined threshold. The controller is further configured to alert an operator based on the comparison.

In yet another aspect of the present disclosure, a method for assisting an operator to maneuver a machine on a worksite is provided. The method includes receiving a signal indicative of a rotation of the ground engaging member of the machine. The method includes determining if the machine is on a reverse traversal. The method includes estimating a number of rotations of the ground engaging member based on the determination of the reverse traversal of the machine. The method also includes comparing the estimated number of rotations with a predetermined threshold. The method further includes alerting the operator based on the comparison.

Other features and aspects of this disclosure will be apparent from the following description and the accompanying drawings.

DETAILED DESCRIPTION

Figure 1:
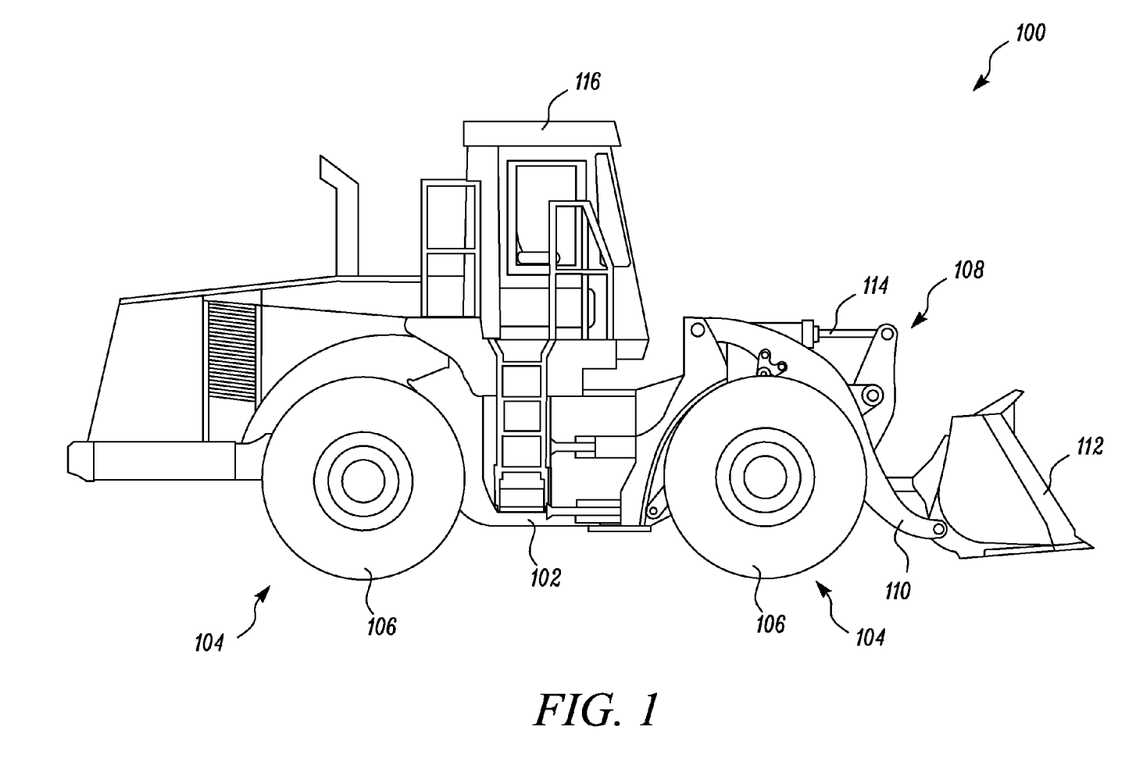
FIG. 1 is an exemplary machine, according to an embodiment of the present disclosure.

Wherever possible, the same reference numbers will be used throughout the drawings to refer to the same or the like parts. Referring to FIG. 1, an exemplary machine 100 is illustrated. More specifically, the machine 100 is a wheel loader. Alternatively, the machine 100 may be any machine including, but not limited to, a wheel loader, an excavator, a shovel, a dozer, a mining truck, an articulated truck, a track type tractor, a forklift, a crane, and so on. The machine 100 may be any machine known in the art associated with industries including, but not limited to, agriculture, transportation, mining, construction, forestry and material handling.

The machine 100 includes a frame 102 or a chassis 102. A power source (not shown) is provided on the frame 102 of the machine 100. The power source may be any power source known in the art such as an internal combustion engine, an electric motor, power storage device such as batteries and a hybrid engine. The power source is configured to provide power to the machine 100 for operational and mobility requirements. The machine 100 includes a set of ground engaging members 104, such as, wheels 106. Alternatively, the ground engaging members 104 may include tracks. The ground engaging members 104 are configured to provide mobility to the machine 100 on ground. The machine 100 also includes a drivetrain (not shown) coupled to the power source and the ground engaging members 104. The drivetrain may include a transmission assembly having one or more gears, shafts, differentials, torque convertors, hydraulic pumps or motors, and so on. The drivetrain may be configured to transmit motive power from the power source to the ground engaging members 104.

The machine 100 includes a linkage assembly 108 pivotally coupled to the frame 102. The linkage assembly 108 includes an arm 110 pivotally coupled to the frame 102. An implement 112, such as, for example, a bucket, is pivotally coupled to the arm 110. The linkage assembly 108 also includes hydraulic or pneumatic cylinders 114 for providing a required spatial movement to the arm 110 and/or the implement 112 with respect to the frame 102 of the machine 100.

It should be noted that the implement 112 may be replaced by any other implement as per system requirements. For example, the implement 112 may include an auger, a blade, a fork, a hammer, a ripper, or any other implement known to one of skill in the art. The linkage assembly 108 is configured to perform tasks such as, earth moving, excavation, digging, demolition, and so on. Further, the linkage assembly 108 may be controlled electrically, mechanically, hydraulically, pneumatically or by a combination thereof.

The machine 100 also includes an operator cabin 116 provided on the frame 102 of the machine 100. The operator cabin 116 includes an operator interface (not shown). The operator interface may include one or more input devices such as pedals, steering, joystick, knobs, levers, switches, a display unit 208 (shown in FIG. 2), and so on. The input device may be configured for operating and controlling one or more parameters of the linkage assembly 108 and/or the machine 100. The parameters related to the linkage assembly 108 may include a tilt of the implement 112, an extension length of the hydraulic or pneumatic cylinders 114, a height of the implement 112 in a raised or a lowered position, and so on. The parameters related to the machine 100 may include the drivetrain, the transmission assembly, a gear position, an engine speed, an output torque, a linear speed of the machine 100 on the ground, a steering angle, a pressure in the hydraulic cylinders 114, and so on.

Figure 2:
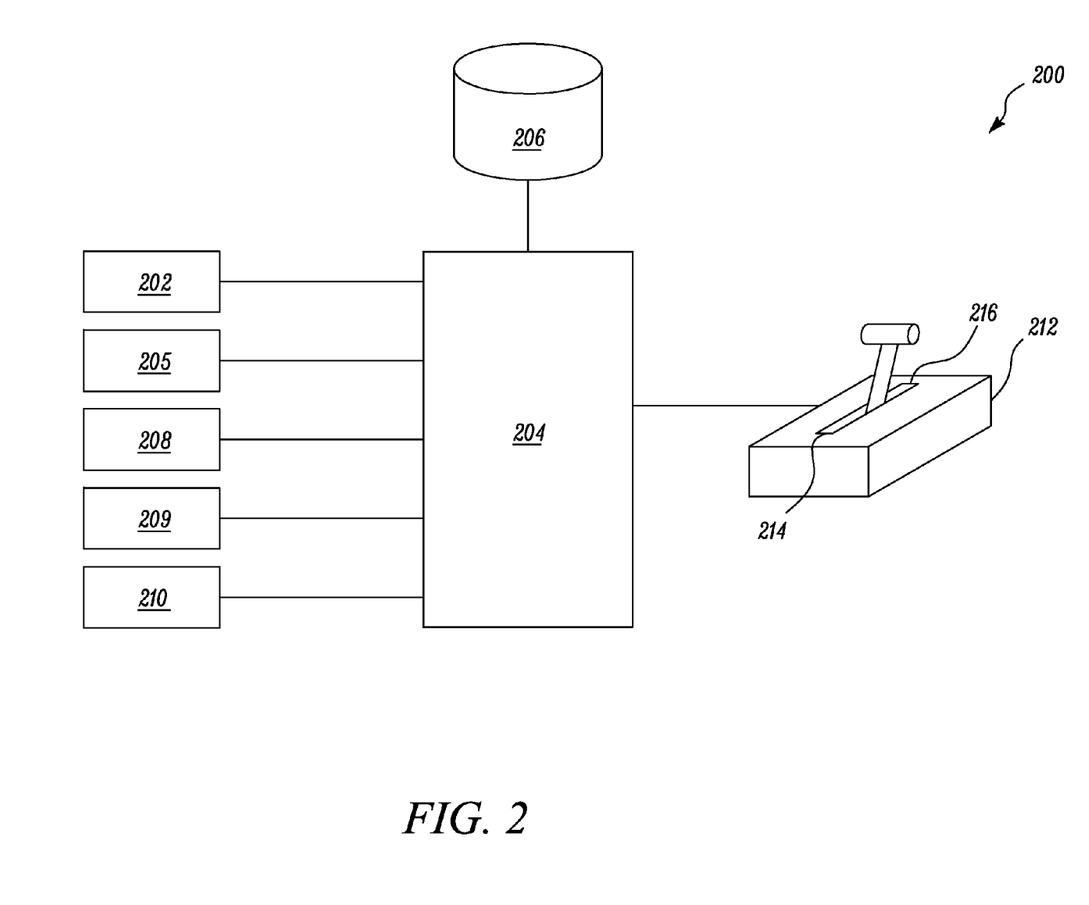
FIG. 2 is a block diagram of an operator assistance system, according to an embodiment of the present disclosure.

The present disclosure relates to an operator assistance system 200 provided on the machine 100. The operator assistance system 200 is configured to assist an operator to maneuver the machine 100 on a worksite. The operator assistance system 200 will be explained in detail with reference to FIGS. 2 to 5. Referring to FIG. 2, a block diagram of the operator assistance system 200 is illustrated. The operator assistance system 200 includes a rotation sensor 202 associated with the transmission assembly of the machine 100. In some embodiments, the rotation sensor 202 may be mounted on an axle (not shown) associated with the wheel 106 of the machine 100. In other embodiments, the rotation sensor 202 may be coupled to components of the transmission assembly such as the gear, the shaft, and so on. In yet other embodiments, the rotation sensor 202 may be coupled to any of a front and/or a rear wheel 106. When the ground engaging member 104 is embodied as the track, the rotation sensor 202 may be coupled to a hub of the track.

The rotation sensor 202 is configured to generate a signal indicative of a rotation of the ground engaging member 104. In one embodiment, the rotation sensor 202 may be configured to generate a signal indicative of a number of rotations of the ground engaging member 104. In other embodiments, the rotation sensor 202 may be configured to generate a signal indicative of a linear distance travelled by the ground engaging member 104 based on the number of rotations of the ground engaging member 104.

The operator assistance system 200 includes a controller 204. The controller 204 is communicably coupled to the rotation sensor 202. Accordingly, the controller 204 is configured to receive the signal indicative of the rotation of the ground engaging member 104. The controller 204 is further configured to determine if the machine 100 is on a reverse traversal. The reverse traversal of the machine 100 may be determined based on a gear command indicative of an engagement of a gear of the machine 100, and/or on an operator input command received through an operator input device 205 communicably coupled to the controller 204.

The operator input device 205 may be any input device known in the art including, but not limited to, a switch, a lever, a touchscreen, and so on located within the operator cabin 116 of the machine 100. In other embodiments, the controller 204 may be communicably coupled to any sensor or a system including, but not limited to, a gear position sensor associated with the transmission assembly, an accelerometer, a magnetometer, a gyroscope, a global positioning system, other navigation system, and so on. The sensor or the system may be configured to generate a signal indicative of the reverse traversal of the machine 100.

Based on the received signals indicative of the rotation of the ground engaging member 104 and the determination of the reverse traversal of the machine 100, the controller 204 is configured to estimate the number of rotations of the ground engaging member 104. The number of rotations may be based on characteristics of the wheel 106 or the track such as, a wheel diameter, a hub diameter, a track length, and so on. In other embodiments, the number of rotations of the ground engaging member 104 may be estimated from the linear distance travelled by the machine 100 by any method known in the art.

The controller 204 is configured to compare the estimated number of rotations with a predetermined threshold. The predetermined threshold may be stored in a database 206 communicably coupled to the controller 204 or a memory (not shown) of the controller 204. In one embodiment, the predetermined threshold may be the number of rotations of the ground engaging member 104 required by the machine 100 to traverse a predetermined distance. For example, in case of the wheel loader, the predetermined threshold may be set to 1.5 or 2 rotations of the wheel 106. In other embodiments, the predetermined threshold may be the linear distance required to be traversed by the machine 100. For example, in such a situation, the predetermined threshold may be set to 25 meters or 30 meters. A person of ordinary skill in the art will appreciate that the values of the predetermined threshold disclosed herein are exemplary and do not limit the scope of the present disclosure.

The controller 204 is configured to alert the operator of when the estimated number of rotations approaches, reaches and/or exceeds the predetermined threshold. In other words, the alert may be provided when the estimated number of rotations is slightly less than, equal to or greater than the predetermined threshold.

Various types of alerts may be provided by the operator assistance system 200. In one embodiment, the alert may be a visual indication. In such a situation, the display unit 208 may be configured to display the visual indication to the operator. The display unit 208 is communicably coupled to the controller 204. The visual indication may include, but not limited to, a text message including numerical, alphabetical, alphanumerical and/or special characters, a progress bar 302 (shown in FIG. 3), glowing of one or more icons, lights, and so on. In other embodiments, the alert may include an audio indication. In such a situation, the controller 204 is communicably coupled to an audio indication unit 209 configured to provide the audio indication to the operator. The audio indication unit 209 may include one or more audio units such as, speakers provided in the operator cabin 116. The audio indication may include, but not limited to, a siren, a chime, a warning sound, an audible message, and so on. In yet other embodiments, the alert provided to the operator may include a combination of any one or more of the visual indications and the audio indications described above.

Referring to FIGS. 3 to 6, various embodiments of the exemplary displays of the operator assistance system 200 displayed on the display unit 208 is illustrated. FIGS. 3A and 3B illustrate one set of exemplary displays 300, according to one embodiment of the present disclosure. As shown in FIG. 3A, the display 300 includes the progress bar 302 having a horizontal orientation. The progress bar 302 may include a scale 304 to indicate the estimated number of rotations performed by the ground engaging members 104. The scale 304 may also include the predetermined threshold marked thereon using a bold line 306. Alternatively, the predetermined threshold may be marked using an arrow, relevant text, and so on. In the display 300, the predetermined threshold is 1.5 rotations. It should be noted that the scale 304 and the predetermined threshold shown in the illustrated figures is merely exemplary and may vary as per system design and configuration.

Figure 3A:
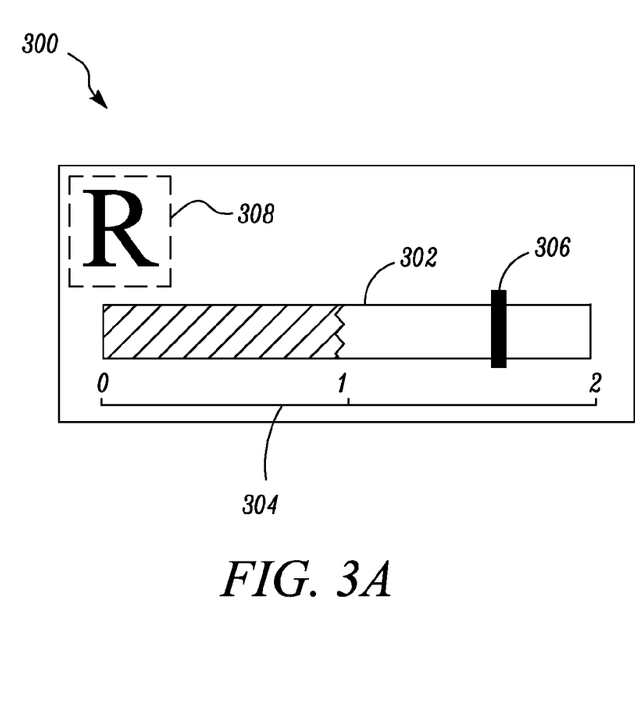
FIG. 3A is an exemplary display of the operator assistance system displayed on a display unit, including a progress bar having a horizontal orientation.
Figure 3B:
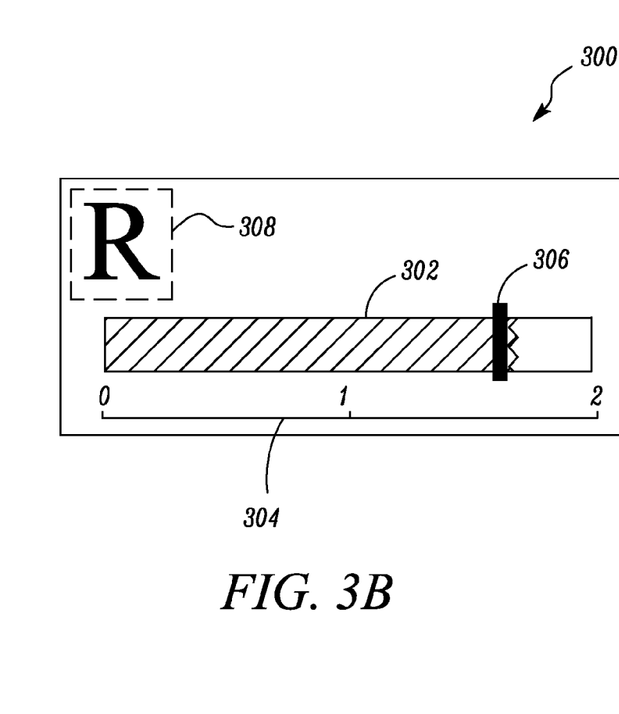
FIG. 3B is an exemplary display of the operator assistance system displayed on the display unit of FIG. 3A, depicting the progress bar increased to a predetermined threshold mark.

When the machine 100 is on the reverse traversal, the display 300 may be activated. Accordingly, as shown in FIGS. 3A and 3B, the display 300 may include an alphabetical notification 308, such as, a letter "R" on the display 300 denoting the reverse traversal of the machine 100. In FIG. 3A, the progress bar 302 is highlighted almost up to a value 1 on the scale 304 indicating that the ground engaging member 104 has completed one rotation. Further, as the machine 100 continues on the reverse traversal, the ground engaging member 104 may continue to perform further rotations. Accordingly, as shown in FIG. 3B, the highlighted portion on the progress bar 302 may increase as the estimated number of rotations of the ground engaging members 104 also increase in number. Further, as the estimated number of rotations may reach or exceed the predetermined threshold of 1.5 rotations, the progress bar 302 may glow, blink and/or change color to provide the alert to the operator. Additionally or alternatively, the controller 204 may also provide audio indication such as, a chime sound through the audio unit to alert the operator.

Figure 4A:
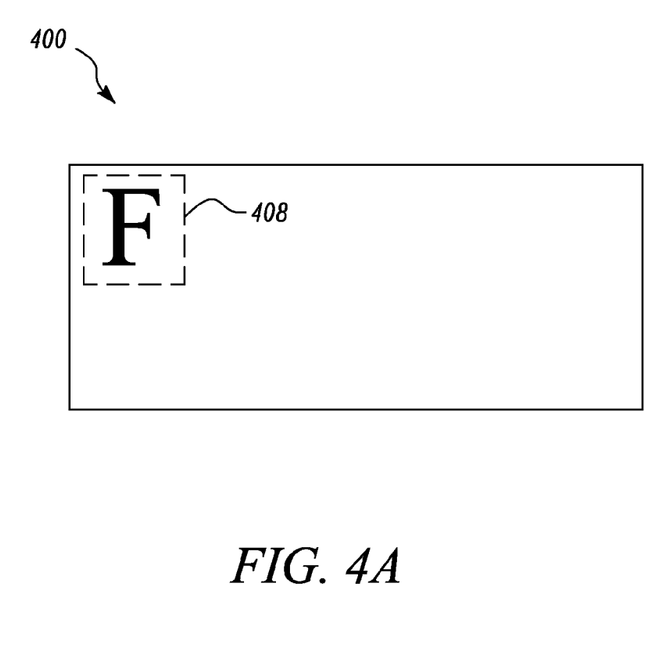
FIG. 4A is an exemplary display of the operator assistance system displayed on a display unit, including the omission of a progress bar from the display during a mode.
Figure 4B:
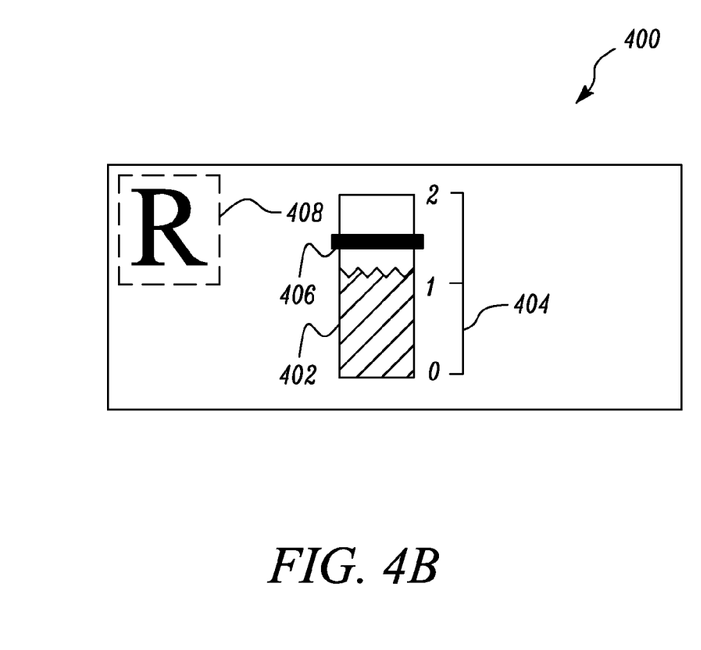
FIG. 4B is an exemplary display of the operator assistance system displayed on a display unit, including a progress bar having a vertical orientation.

Another set of exemplary displays 400 is shown in FIGS. 4A and 4B. When the machine 100 is on the forward traversal, the alphabetical notification 408 having a letter "F" and denoting the forward traversal of the machine 100 is provided on the display 400. The progress bar or any other form of the alert may be omitted from the display 400 during the forward traversal. It should be noted that the alphabetical notification 408 described herein is merely exemplary. In other embodiments, the display 400 may include an arrow or any other icon indicative of the forward traversal of the machine 100.

Referring to FIG. 4B, an alternate embodiment of the display 300 shown in FIGS. 3A and 3B is illustrated. In the display 400 shown in FIG. 4B, the progress bar 402 and the scale 404 has a vertical orientation. Further, the predetermined threshold and the alphabetical notification 408 has a configuration similar to that described in relation to FIG. 3A.

Figure 5A:
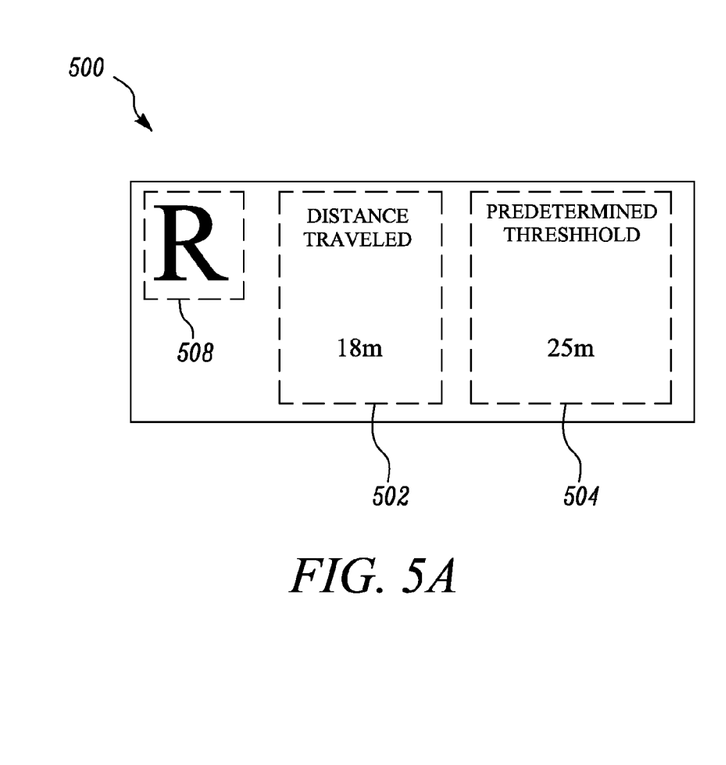
FIG. 5A is an exemplary display of the operator assistance system displayed on a display unit, including at least one of a first textual notification and a second textual notification.
Figure 5B:
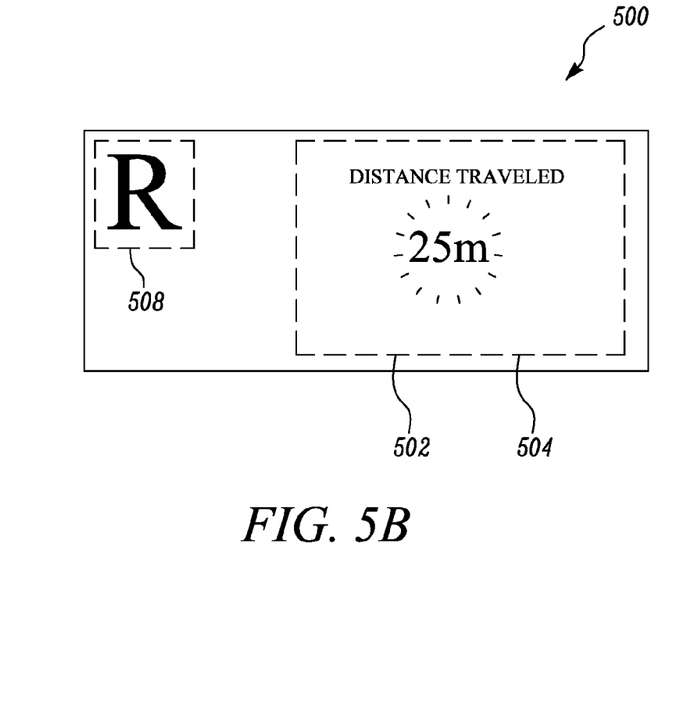
FIG. 5B is an exemplary display of the operator assistance system displayed on the display unit of FIG. 5A, depicting a change in state of at least one of a first textual notification and a second textual notification when a predetermined threshold is exceeded.

Referring to FIGS. 5A and 5B, another set of exemplary displays 500 are provided, according to one embodiment of the present disclosure. As shown in FIG. 5A, the display 500 includes the alphabetical notification 508 having the letter "R" and denoting the reverse traversal of the machine 100. Additionally, the display 500 includes a first textual notification 502 including alphabetical and/or numerical characters denoting the exemplary distance of 18 meters travelled by the machine 100. This exemplary distance may be based on the estimated number of rotations performed by the ground engaging members 104. In one example, the distance may be computed by multiplying the estimated number of rotations and a circumference of the wheel 106 of the machine 100. The display 500 may also include a second textual notification 504 denoting the predetermined threshold. Further, as the machine 100 continues on the reverse traversal, as shown in FIG. 5B, the machine 100 is shown to have reached or exceeded the exemplary predetermined threshold of 25 meters. In this case, the first and/or second textual notifications 502, 504 may glow, blink and/or change color to provide the alert to the operator.

Figure 6A:
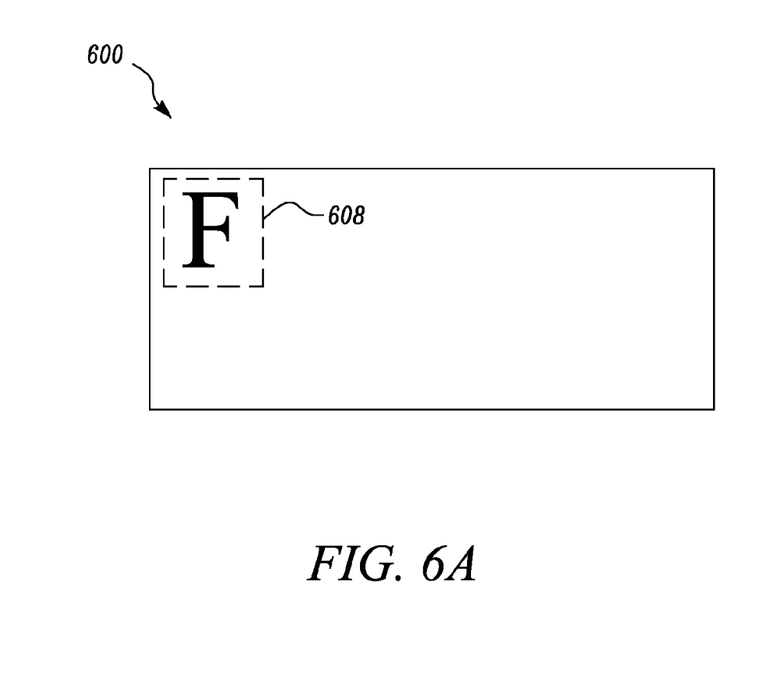
FIG. 6A is an exemplary display of the operator assistance system displayed on a display unit, including the omission of a first textual notification and a second textual notification during a mode.
Figure 6B:
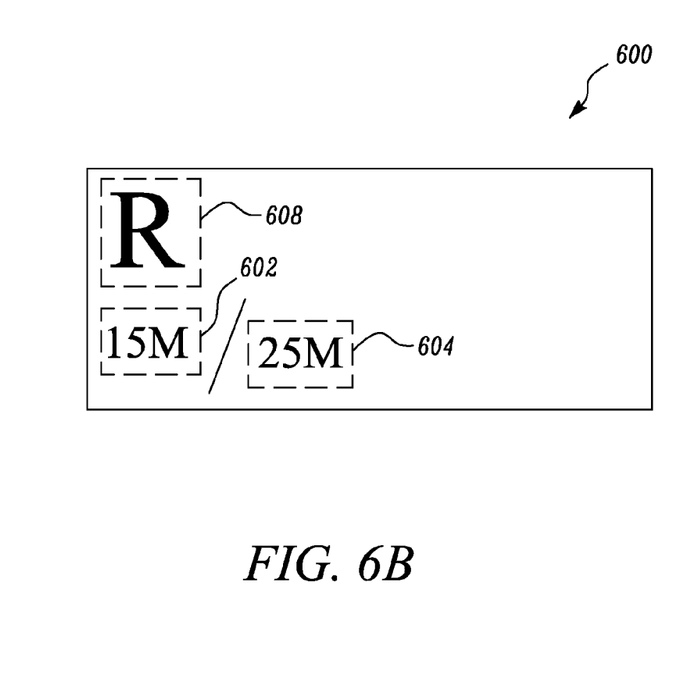
FIG. 6B is an exemplary display of the operator assistance system displayed on a display unit, including at least one of a first textual notification and a second textual notification.

Referring to FIG. 6A, when the machine 100 is in the forward traversal, the alphabetical notification 608 displays the letter "F" on the display 600 denoting the forward traversal of the machine 100. Also, the first and second textual notification 502, 504 shown in FIGS. 5A and 5B is omitted from the display 600 during the forward traversal. Referring to FIG. 6B, yet another embodiment of the display 600 is illustrated. In the display 600 shown in FIG. 6B, when the machine 100 is in the reverse traversal a different format of the first and second textual notification 602, 604 is illustrated. The display 600 includes the first and second textual notifications 602, 604 separated by a forward slash, a back slash, a semicolon, a hyphen, and so on. In another embodiment, the first and second textual notifications 602, 604 may have alphabetical and/or numerical characters of different font sizes to differentiate between the distance travelled or the estimated number of rotations performed by the ground engaging members 104 and the predetermined threshold.

Referring to FIG. 2 again, the operator assistance system 200 may include an implement position sensor 210 communicably coupled to the controller 204. The implement position sensor 210 is configured to generate a signal indicative of a current position of the implement 112 with respect to the frame 102 of the machine 100. The implement position sensor 210 may be any sensor including, but not limited to, an accelerometer, a magnetometer, and a gyroscope.

As shown in FIG. 2, the operator assistance system 200 also includes an operator implement input device 212 communicably coupled to the controller 204. The operator implement input device 212 may include the one or more input devices, such as, the pedals, the steering, the joystick, the knobs, the levers, the switches, and so on. The operator implement input device 212 is configured to operate and control one or more parameters of the linkage assembly 108 and/or the implement 112.

When the operator implement input device 212 is in a first detent 214, the implement 112 of the machine 100 may be raised from the current position of the implement 112. In the first detent 214, the operator implement input device 212 includes a first limit activated through the first detent 214. The first limit is configured to raise the implement 112 to a pre-defined maximum position "P1" (shown in FIG. 7) relative to the frame 102 of the machine 100. During operation of the implement 112, the operator may engage the operator implement input device 212 in the first limit during the forward traversal of the machine 100, which will be explained later in detail. The operator may engage the operator implement input device 212 in the first detent 214 and activate the first limit during the forward traversal of the machine 100 while the machine 100 is moving towards an unloading location for unloading of material being carried by the implement 112.

Additionally, in the first detent 214, the operator implement input device 212 includes a second limit activated through the first detent 214. The second limit is configured to raise the implement 112 to a pre-defined intermediate position "P2" (shown in FIG. 7) relative to the frame 102 of the machine 100 when the machine 100 is in the reverse traversal. The pre-defined intermediate position "P2" is distanced between the pre-defined minimum position "P3" and the pre-defined maximum position "P1". In one embodiment, the pre-defined intermediate position "P2" is half way between the pre-defined minimum position "P3" and the pre-defined maximum position "P1". The operator may engage the operator implement input device 212 in the first detent 214 and activate the second limit during the reverse traversal of the machine 100 towards a junction point where the machine 100 may change course from the reverse traversal to the forward traversal.

When the operator implement input device 212 is in a second detent 216, the implement 112 may be lowered from the current position of the implement 112. In the second detent 216, the operator implement input device 212 includes a third limit activated through the second detent 216. The third limit is configured to lower the implement 112 to a pre-defined minimum position "P3" (shown in FIG. 7) relative to the frame 102 of the machine 100. The pre-defined minimum position "P3" is lower than the pre-defined maximum position "P1". The operator may engage the operator implement input device 212 in the second detent 216 and activate the third limit during any of the forward or the reverse traversal of the machine 100.

Figure 7:
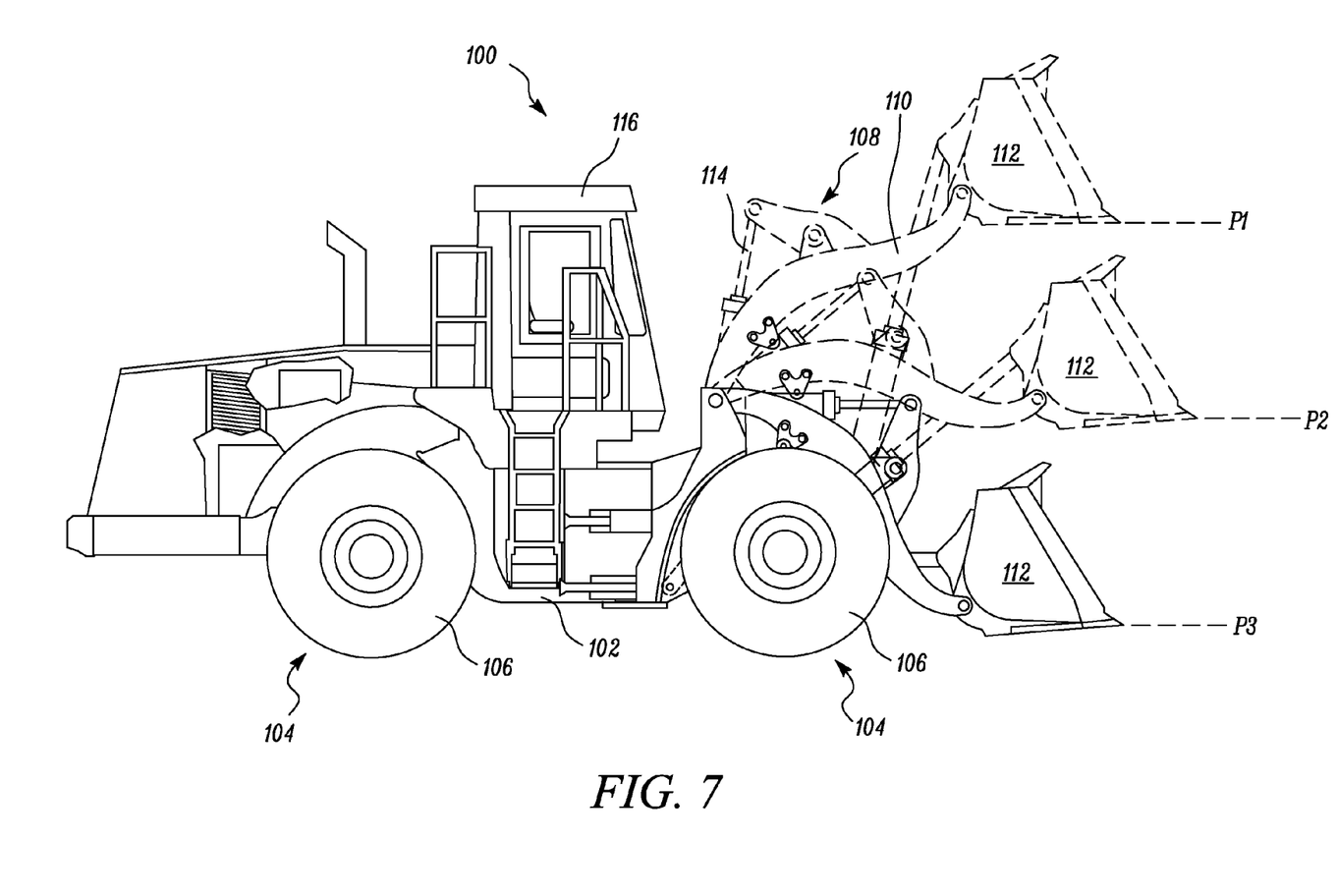
FIG. 7 is another view of the machine of FIG. 1 showing different positions of a linkage assembly of the machine, according to an embodiment of the present disclosure.

As explained earlier, the controller 204 is configured to receive the signal indicative of the current position of the implement 112 from the implement position sensor 210. Also, the controller 204 is configured to determine if the machine 100 is on the reverse traversal. Based on the received signal indicative of the current position of the implement 112 and the determination of the reverse traversal of the machine 100, the controller 204 is configured to compare the current position of the implement 112 with the pre-defined intermediate position "P2". Based on the comparison, the controller 204 is configured to automatically control the movement of the implement 112 from the current position to the pre-defined intermediate position "P2". For example, consider a situation in which the current position of the implement 112 may be the pre-defined minimum position "P3" or between the pre-defined minimum position "P3" and the pre-defined intermediate position "P2" after the loading of the material into the implement 112, and the machine 100 is in the reverse traversal towards the junction point. In this situation, when the operator engages the operator implement input device 212 in the first detent 214 and activates the second limit to raise the implement 112, the controller 204 may be configured to automatically control an upward movement of the implement 112 from the current position to the pre-defined intermediate position "P2".

During the reverse traversal of the machine 100 and the movement of the implement 112 from the current position to the pre-defined intermediate position "P2", the controller 204 is also configured to determine if the estimated number of rotations of the ground engaging member 104 has reached the predetermined threshold. When the predetermined threshold is reached, the controller 204 is configured to provide the alert to the operator via the audio and/or visual indication.

The controller 204 is then configured to determine if the machine 100 is on the forward traversal from the junction point towards the unloading location. Based on the received signal indicative of the current position of the implement 112 and the determination of the forward traversal of the machine 100, the controller 204 is configured to compare the current position of the implement 112 with the pre-defined maximum position "P1". Based on the comparison, the controller 204 is configured to automatically control the movement of the implement 112 from the current position to the pre-defined maximum position "P1" while raising the implement 112. For example, when the current position of the implement 112 may be the pre-defined intermediate position "P2" or between the pre-defined minimum position "P3" and the pre-defined intermediate position "P2", and the machine 100 may be in the forward traversal, and the operator may engage the operator implement input device 212 in the first detent 214 and activate the first limit, the controller 204 may be configured to automatically control the upward movement of the implement 112 from the current position to the pre-defined maximum position "P1".

In one example, based on the received signal indicative of the current position of the implement 112 and the determination of any of the forward traversal or the reverse traversal of the machine 100, when the operator indicates that he wishes to lower the implement 112 by engaging the operator input device 205 in the second detent 216 and activating the third limit, the controller 204 is configured to compare the current position of the implement 112 with the pre-defined minimum position "P3". Based on the comparison, the controller 204 is configured to automatically control a downward movement of the implement 112.

It should be noted that, in some embodiments, the operator may be unable to configure the pre-defined maximum position "P1", the pre-defined intermediate position "P2", and/or the pre-defined minimum position "P3". In other words, the pre-defined maximum position "P1", the pre-defined intermediate position "P2", and/or the pre-defined minimum position "P3" may be factory set and may be stored in the database 206 or the memory of the controller 204. In other embodiments, the pre-defined maximum position "P1", the pre-defined intermediate position "P2", and/or the pre-defined minimum position "P3" may be configurable by the operator based on operational requirements. The operator assistance system 200 may be activated manually or automatically. In the embodiment, when the operator assistance system 200 may be activated manually, the operator interface may include the input device such as the switch, the lever, the button, and so on configured to switch on and switch off the operator assistance system 200. In the embodiment, when the operator assistance system 200 may be activated automatically, the controller 204 may be configured to activate the system based on the received signal indicative of the reverse traversal of the machine 100.

A person of ordinary skill in the art will appreciate that the displays 300, 400, 500, 600 and the values stated therein are exemplary. The operator assistance system 200 may provide other different types of alerts to operator during the reverse traversal of the machine 100 based on the estimated number of rotations of the ground engaging member 104. The controller 204 may embody a single microprocessor or multiple microprocessors for receiving signals from components of the operator assistance system 200. Numerous commercially available microprocessors may be configured to perform the functions of the controller 204. It should be appreciated that the controller 204 may embody a machine microprocessor capable of controlling numerous machine functions. A person of ordinary skill in the art will appreciate that the controller 204 may additionally include other components and may also perform other functions not described herein.

INDUSTRIAL APPLICABILITY

Figure 8:
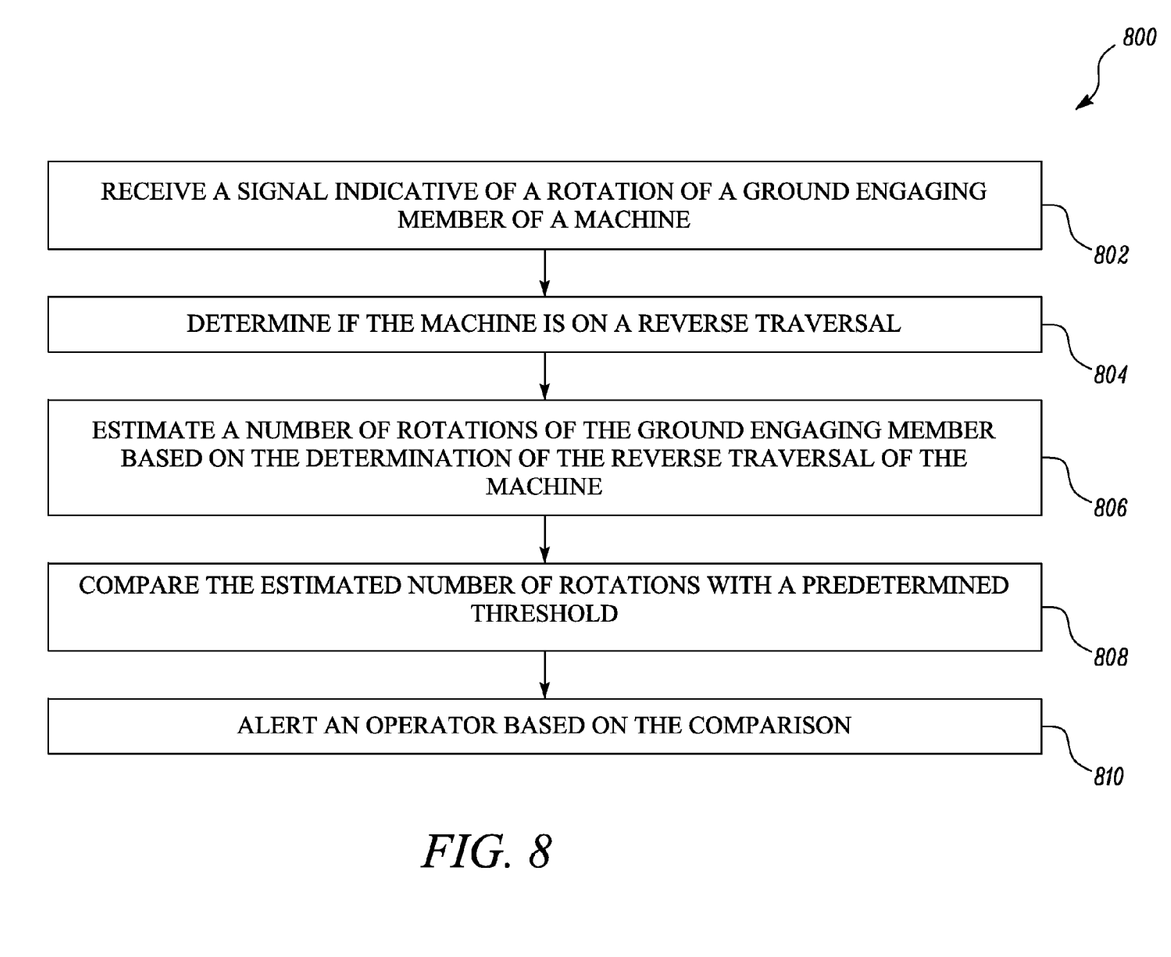
FIG. 8 is a flowchart of an exemplary method of working of the operator assistance system, according to an embodiment of the present disclosure.

The present disclosure relates to a method 800 of working of the operator assistance system 200, such as, for example, during the load-dump work cycle. Referring to FIG. 8, a flowchart of the method 800 is illustrated. For example, when the machine 100 is at the loading location, the operator may engage the operator input device 205 into the "F" position and the operator implement input device 212 in the second detent 216, thus, activating the third limit to position the implement 112 of the machine 100 relatively low with respect to the frame 102 in order to load material into the implement 112. After loading of the material, the operator may engage the operator input device 205 into the "R" position to command the machine 100 to travel rearward for a distance of a first leg of the "V" shaped pattern up to the junction point.

At step 802, the controller 204 receives the signal indicative of the rotation of the ground engaging member 104 of the machine 100. At step 804, the controller 204 determines if the machine 100 is on the reverse traversal. At step 806, the controller 204 estimates the number of rotations of the ground engaging member 104 based on the determination of the reverse traversal of the machine 100. At step 808, the controller 204 compares the estimated number of rotations with the predetermined threshold. At step 810, the controller 204 alerts the operator of approaching, reaching and/or exceeding of the predetermined threshold based on the comparison. The alert may include the visual and/or audio indications provided through the display unit 208 and/or the audio indication unit 209 respectively. At such alert, the operator may engage the operator input device 205 into the "F" position to travel from the junction point along a second leg of the "V" shaped pattern from the loading location to the unloading location. This may reduce the operator's mental steps during a segment of the work cycle and may make the work cycle more productive by providing information to the operator to avoid over or under travel during the reverse travel of the work cycle.

In further steps of the method 800 of working of the operator assistance system 200, the implement 112 may be automatically positioned at desired elevations. To this end, the controller 204 can receive the signal indicative of the current position of the implement 112 of the machine 100 from the implement position sensor 210. Further, the controller 204 determines if the machine 100 is on the reverse traversal or the forward traversal. The controller 204 then compares the current position of the implement 112 with the pre-defined intermediate position "P2". Based on the comparison, the engagement of the operator implement input device 212 in the first detent 214, the activation of the first limit and the forward traversal of the machine 100, the controller 204 raises the implement 112 from the current position to the pre-defined maximum position "P1". Alternatively, based on the comparison, the engagement of the operator implement input device 212 in the second detent 216, the activation of the third limit and the forward traversal of the machine 100, the controller 204 lowers the implement 112 from the current position to the pre-defined minimum position "P3". Alternatively, based on the comparison, the engagement of the operator implement input device 212 in the first detent 214, the activation of the second limit and the reverse traversal of the machine 100, the controller 204 raises the implement 112 from the current position to the pre-defined intermediate position "P2".

During loading of the material into the implement 112 at the loading location the implement 112 may be at the pre-defined minimum position "P3" or some other location determined by the operator. After loading of the material, the operator may engage the operator input device 205 into the "R" position to command the machine 100 to travel rearward for a distance of the first leg of the "V" shaped pattern up to the junction point. Also, the operator may engage the operator implement input device 212 in the first detent 214 activating the second limit during the reverse traversal of the machine 100. As a result, the operator assistance system 200 may automatically raise the implement 112 up to the pre-defined intermediate position "P2". In addition to the automatic lift assist, the operator assistance system 200 may simultaneously provide the alert to the operator of approaching, reaching and/or exceeding of the predetermined threshold during the reverse traversal.

At the junction point, the operator may engage the operator input device 205 into the "F" position to travel from the junction point along the second leg of the "V" shaped pattern from the loading location to the unloading location. Also, the operator may engage the operator implement input device 212 in the first detent 214 activating the first limit during the forward traversal of the machine 100 to raise the implement 112 to the pre-defined maximum position "P1" or any other desired position for unloading or dumping the material, for example, over a bed of a truck and so on. To this end, when the machine 100 begins the forward traversal from the junction point up to the unloading location, the operator assistance system 200 may be configured to automatically raise the implement 112 from the pre-defined intermediate position "P2" up to the pre-defined maximum position "P1".

The automatic controlling of the movement of the implement 112 based on the traversal of the machine 100 across the entire travel path of the machine 100 provides for a system that allows the implement 112 to optimally reach the pre-defined maximum position "P1". Such an operational strategy may reduce or prevent, as the case may be, unbalancing or tipping of the machine 100 during maneuvering or changing direction of travel path of the machine 100 in the raised position of the loaded implement 112. Also, the alert provided by the operator assistance system 200 may indicate to the operator to of reaching the location from which the machine 100 may need to be maneuvered in the forward direction to reach the unloading location. This may reduce the mental pressure on the operator who may otherwise need to perform a number of tasks simultaneously during the load-dump cycle. The system and method disclosed herein may facilitate the reduction of wasteful travel of the machine 100 and mental steps of the operator, resulting in the reduction of operational errors and the increase of overall productivity.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A system for assisting an operator to maneuver a machine on a worksite, the system comprising:
   a rotation sensor associated with a transmission assembly of the machine,
      the rotation sensor configured to generate a signal indicative of a rotation of a ground engaging member of the machine; and
   a controller communicably coupled to the rotation sensor, the controller configured to:
      receive the signal indicative of the rotation of the ground engaging member of the machine;
      determine if the machine is on a reverse traversal;
      estimate a number of rotations of the ground engaging member based on the determining if the machine is on the reverse traversal;
      compare the estimated number of rotations with a predetermined threshold,
         the predetermined threshold including a particular number of rotations of the ground engaging member; and
      alert the operator based on the comparison.

2. The system of claim 1, wherein the alert includes at least one of a visual indication or an audio indication.

3. The system of claim 2 further comprising a display unit configured to display the visual indication to the operator.

4. The system of claim 1, wherein the ground engaging member includes a wheel or a track of the machine.

5. The system of claim 1, wherein the rotation sensor is mounted on an axle associated with the ground engaging member of the machine.

6. The system of claim 1, wherein the system is activated manually or automatically.

7. The system of claim 1 further comprising an operator implement input device, in communication with the controller, having a first detent to raise an implement and a second detent to lower the implement,
   the operator implement input device having a first limit and a second limit associated with the first detent, and a third limit associated with the second detent to lower the implement to a pre-defined minimum position, and
   the operator implement input device including an implement position sensor configured to generate a signal indicative of a current position of the implement of the machine.

8. The system of claim 7, wherein the operator implement input device has the first limit activated through the first detent during a forward traversal, the first limit configured to raise the implement to a pre-defined maximum position, wherein the pre-defined maximum position is higher than the pre-defined minimum position, and wherein the operator implement input device has the second limit activated through the first detent during the reverse traversal, the second limit configured to raise the implement to a pre-defined intermediate position distanced between the pre-defined maximum position and the pre-defined minimum position, the controller is further configured to:
   receive the signal indicative of the current position of the implement;
   compare the current position of the implement with the pre-defined intermediate position based on the determination of the reverse traversal of the machine; and
   automatically control a movement of the implement to the pre-defined intermediate position based on the comparison step.

9. The system of claim 8, wherein the controller is further configured to:
   receive the signal indicative of the current position of the implement;
   determine if the machine is on a forward traversal;
   compare the current position of the implement with the pre-defined maximum position based on the determination of the forward traversal; and
   automatically control the movement of the implement to the pre-defined maximum position based on the comparison between the current position and the pre-defined maximum position.

10. The system of claim 1, wherein the reverse traversal of the machine is determined based on at least one of a gear command signal and an operator input.

11. A machine comprising:
a rotation sensor associated with a transmission assembly of the machine, the rotation sensor being configured to generate a signal indicative of a rotation of a wheel of the machine; and
a controller communicably coupled to the rotation sensor, the controller being configured to:
receive the signal indicative of the rotation of the wheel of the machine;
determine if the machine is on a reverse traversal;
estimate a number of rotations of the wheel based on the determining if the machine is on the reverse traversal;
compare the estimated number of rotations of the wheel with a predetermined threshold,
the predetermined threshold including a particular number of rotations, of the wheel, required by the machine to traverse a particular distance; and
alert an operator based on the comparison.

12. The machine of claim 11, wherein the alert includes at least one of a visual indication or an audio indication.

13. The machine of claim 11, wherein the rotation sensor is mounted on an axle associated with the wheel of the machine.

14. The machine of claim 11, wherein the system is activated manually or automatically.

15. The machine of claim 11 further comprising an operator implement input device in communication with the controller, having a first detent to raise an implement and a second detent to lower the implement,
the operator implement input device having a first limit and a second limit associated with the first detent, and a third limit associated with the second detent to lower the implement to a pre-defined minimum position, and
the operator implement input device including an implement position sensor configured to generate a signal indicative of a current position of the implement of the machine.

16. The machine of claim 15, wherein the operator implement input device has the first limit activated through the first detent during a forward traversal, the first limit configured to raise the implement to a pre-defined maximum position, wherein the pre-defined maximum position is higher than the pre-defined minimum position, and wherein the operator implement input device has the second limit activated through the first detent during the reverse traversal, the second limit configured to raise the implement to a pre-defined intermediate position distanced between the pre-defined maximum position and the pre-defined minimum position, the controller is further configured to:
receive the signal indicative of the current position of the implement;
compare the current position of the implement with pre-defined intermediate position based on the determination of the reverse traversal of the machine; and
automatically control a movement of the implement to the pre-defined intermediate position based on the comparison step.

17. The machine of claim 16, wherein the controller is further configured to:
receive the signal indicative of the current position of the implement;
determine if the machine is on a forward traversal;
compare the current position of the implement with the pre-defined maximum position based on the determination of the forward traversal; and
automatically control the movement of the implement to the pre-defined maximum position based on the comparison between the current position and the pre-defined maximum position.

18. The machine of claim 11, wherein the reverse traversal of the machine is determined based on at least one of a gear command signal and an operator input.

19. A method for assisting an operator to maneuver a machine on a worksite, the method comprising:
receiving, from a rotation sensor, a signal indicative of a rotation of a ground engaging member of the machine;
determining, by a controller communicably coupled to the rotation sensor, if the machine is on a reverse traversal;
estimating, by the controller, a number of rotations of the ground engaging member based on the determining if the machine is on the reverse traversal;
comparing, by the controller, the estimated number of rotations with a predetermined threshold, the predetermined threshold including a particular number of rotations of the ground engaging member; and
alerting, by the controller, the operator based on the comparison.

20. The method of claim 19 further comprising:
receiving, from an implement position sensor, a signal indicative of a current position of an implement of a machine;
determining, by the controller, when the machine is on a reverse traversal or a forward traversal;
comparing, by the controller, the current position of the implement with a pre-defined intermediate position; and
in response to an operator implement input device, automatically controlling, by the controller, a movement of the implement to the pre-defined intermediate position when the machine is on the reverse traversal, or automatically controlling, by the controller, the movement of the implement to a pre-defined maximum position when the machine is on the forward traversal.

* * * * *

UNITED STATES PATENT AND TRADEMARK OFFICE
CERTIFICATE OF CORRECTION

PATENT NO. : 9,529,347 B2  
APPLICATION NO. : 14/470977  
DATED : December 27, 2016  
INVENTOR(S) : Roach et al.

Page 1 of 1

It is certified that error appears in the above-identified patent and that said Letters Patent is hereby corrected as shown below:

Column 12, Line 34, In Claim 8, delete "traversal, the" and insert -- traversal of the machine, the --.

Column 12, Line 39, In Claim 8, delete "traversal, the" and insert -- traversal of the machine, the --.

Column 12, Line 60, In Claim 8, delete "traversal; and" and insert -- traversal of the machine; and --.

Column 13, Line 42, In Claim 16, delete "traversal, the" and insert -- traversal of the machine, the --.

Column 13, Lines 47-48, In Claim 16, delete "traversal, the" and insert -- traversal of the machine, the --.

Column 14, Line 13, In Claim 17, delete "traversal; and" and insert -- traversal of the machine; and --.

Signed and Sealed this
Second Day of May, 2017

Michelle K. Lee
*Director of the United States Patent and Trademark Office*